(12) United States Patent
Suzuki et al.

(10) Patent No.: US 7,823,917 B2
(45) Date of Patent: Nov. 2, 2010

(54) AIR BAG MODULE

(75) Inventors: Hidenobu Suzuki, Shizuoka (JP);
Takashi Tokita, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 11/258,141

(22) Filed: Oct. 26, 2005

(65) Prior Publication Data

US 2006/0091651 A1    May 4, 2006

(30) Foreign Application Priority Data

Oct. 27, 2004    (JP) .............................. 2004-312171

(51) Int. Cl.
*B60R 21/16*    (2006.01)
(52) U.S. Cl. ..................................... 280/732
(58) Field of Classification Search .................. 280/732
See application file for complete search history.

(56) References Cited

U.S. PATENT DOCUMENTS

| 5,226,670 | A | * | 7/1993 | Wright et al. ................ 280/738 |
| 5,295,707 | A | * | 3/1994 | Satoh et al. ............... 280/728.2 |
| 5,405,163 | A |   | 4/1995 | Amamori et al. |
| 5,462,305 | A | * | 10/1995 | Hamada .................... 280/728.2 |
| 5,533,745 | A | * | 7/1996 | Jenkins et al. ........... 280/728.2 |
| 5,533,747 | A | * | 7/1996 | Rose ........................ 280/728.2 |
| 5,588,675 | A | * | 12/1996 | Lotspih ....................... 280/738 |
| 6,135,495 | A | * | 10/2000 | Redgrave et al. ............. 280/732 |
| 6,176,511 | B1 | * | 1/2001 | Adkisson et al. .......... 280/728.2 |
| 6,336,661 | B1 |   | 1/2002 | Amamori |
| 6,799,775 | B2 |   | 10/2004 | Schaufele |

FOREIGN PATENT DOCUMENTS

| JP |         9020199 | 1/1997 |
| JP |  2001-063503 A | 3/2001 |

\* cited by examiner

*Primary Examiner*—Faye M. Fleming
(74) *Attorney, Agent, or Firm*—Sughrue Mion, PLLC

(57) ABSTRACT

An air bag module mounted in front of a front passenger seat of an automotive vehicle. The air bag module includes a case having an opening. An air bag is accommodated within and connected with the case. The air bag is projectable out of the case through the opening of the case. A gas generator is provided for generating gas to be supplied into the air bag to inflate the air bag. A lid member is provided for covering the opening of the case. The case has a bottom wall section including a weakened portion which serves as a starting point of deformation of the case when an impact is applied to the case.

11 Claims, 5 Drawing Sheets

AIR BAG MODULE

BACKGROUND OF THE INVENTION

This invention relates to improvements in an air bag module which is mounted on a vehicle and includes an air bag which inflates and deploys to protect passengers at the event of a vehicle collision or the like.

Nowadays, a number of stock-cars are provided with an air bag module for a passenger at a front passenger seat as means for improving safety to the passenger at the event of the collision. By the way, it is required for an instrument panel of an automotive vehicle to have a function for absorbing energy of striking of the passenger to the instrumental panel upon gradual deformation of the instrument panel when the passenger comes into striking against the instrument panel. In other words, the instrument panel is required to have a function to absorb an impact upon deforming the side of an air bag module to prevent an excess impact from being transmitted to the passenger not only when the air bag is required to deploy at an accident or the like but also when the head or hand of the passenger unavoidably hits against the instrumental panel to which the air bag is mounted.

Along with this requirement, a technique is disclosed in Japanese Patent Provisional Publication No. 2001-63503, in which this air bag module includes a case having an opening at its front side. The case accommodates therein and connects with an air bag. The air bag is supplied with gas generated by a gas generator (or an inflator) so as to be inflated. The opening of the case is covered with a lid member. The case is fixedly provided at its side surfaces with thick plates. At least a part of the rear section of the thick plate is fixed on the side surface of the case. The part of the rear section of the thick plate and a side section (to which the rear section of the thick plate is fixed) of the case project outside.

According to the above technique, the thick plate increases the rigidity of the case so that the opening of the case is prevented from being expanded upon deformation of the case to which the deploy pressure of the air bag is applied. Additionally, when an impact of the passenger is applied to the instrumental panel during non-deploy of the air bag, the thick plate deforms the case to absorb energy of the impact to the instrumental panel, so that a reaction force of impact of the passenger to the instrumental panel is reduced. Specifically, when the impact is applied, the case is bent at its portion near a bent portion of the thick plate. Therefore, the upper end of the thick plate will enter an air bag accommodating chamber which is defined within the case, deforming the case.

SUMMARY OF THE INVENTION

However, in a small-sized air bag module which is demanded in recent years, it is required to minimize a clearance between an outer surface of the folded air bag and an inner surface of the air bag accommodating chamber. On the assumption that this technique is employed to such a small-sized air bag module, the above thick plate will interfere with the folded air bag so that the case cannot deform as previously expected. As a result, there is a fear that the impact acted on the instrumental panel may not be absorbed.

In view of the above problem, it is an object of the present invention is to provide an air bag module which can effectively overcome drawbacks encountered in conventional air bag modules.

Another object of the present invention is to provide an improved air bag module which can securely absorb an impact acted on an instrumental panel without occurrence of interference of a case with an folded air bag in a process of impact absorption.

According to the present invention, an air bag module comprising a case having an opening. An air bag is accommodated within and connected with said case. The air bag is projectable out of said case through the opening of said case. A gas generator is provided for generating gas to be supplied into said air bag to inflate said air bag. A lid member is provided for covering the opening of said case. In this air bag module, the case includes a bottom wall section including a weakened portion.

With the air bag module according to the present invention, when striking of a dummy doll occurs against the instrumental panel, the case is deformed in such a manner that the weakened portion of the bottom wall section serves as a starting point of deformation, without causing buckling of a vertical wall or side wall section of the case. As a result, in a process for absorbing an impact acted on the instrumental panel, the case can securely absorb the impact without interference with the folded air bag.

BRIEF DESCRIPTION OF THE DRAWINGS

In the drawings, like reference numerals designate like parts and elements throughout all figures in which.

DETAILED DESCRIPTION OF THE INVENTION

Referring now to FIGS. 1 to 6, an embodiment of an air bag module according to the present invention will be discussed in detail.

Figure 1:
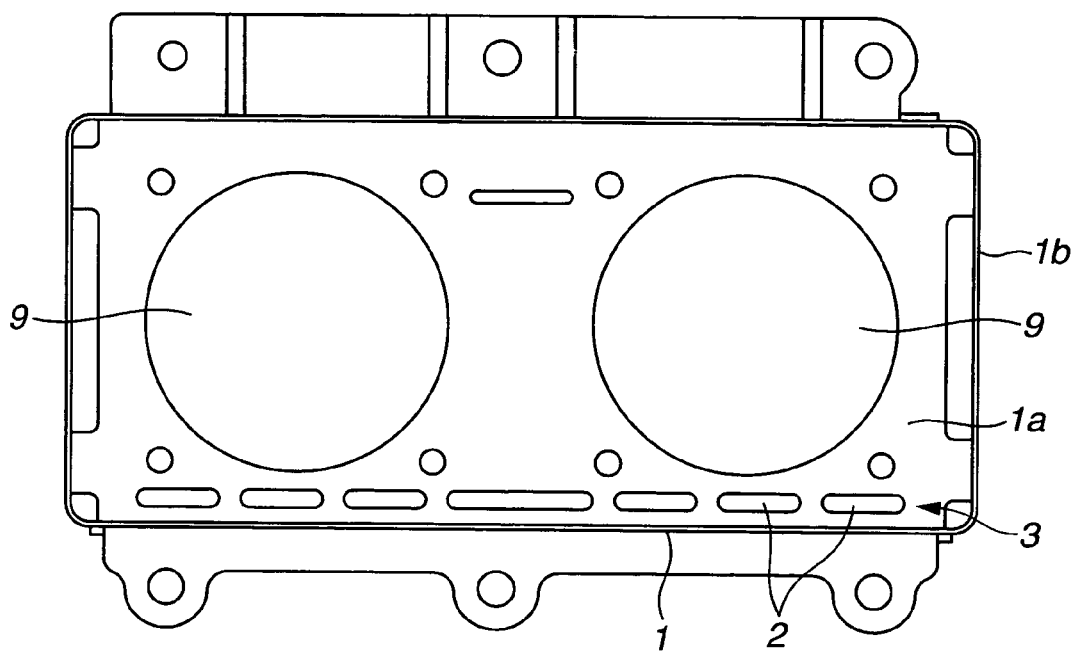
FIG. 1 is a bottom view of an embodiment of an air bag module according to the present invention.
Figure 2:
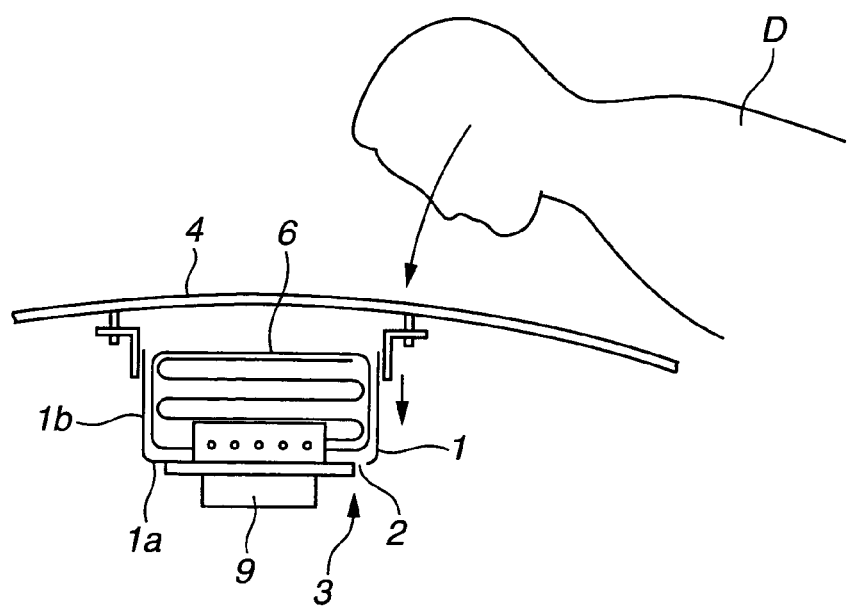
FIG. 2 is a cross-sectional illustration of the air bag module of FIG. 1, showing the basic configuration of the air bag module.
Figure 3:
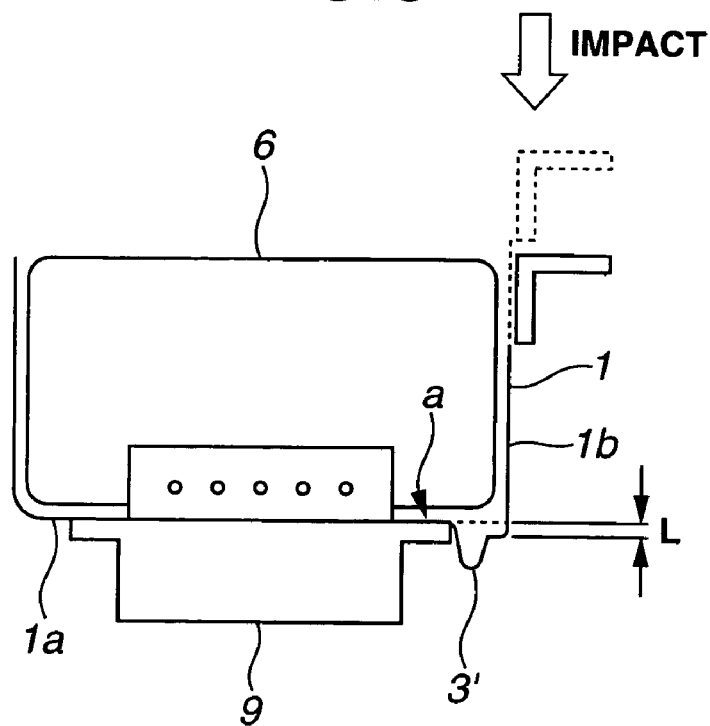
FIG. 3 is a cross-sectional illustration of the air bag module of FIG. 1, showing a manner for absorbing an impact acted on an instrumental panel.
Figure 4:
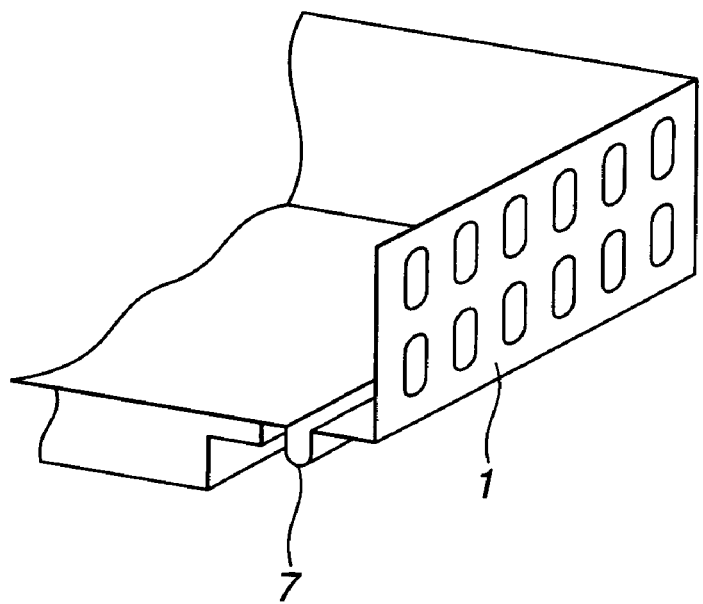
FIG. 4 is a fragmentary perspective view of a modified example of a case of the air bag module of the embodiment, provided with a weakened portion which is formed into the U-shape in cross-section.
Figure 5:
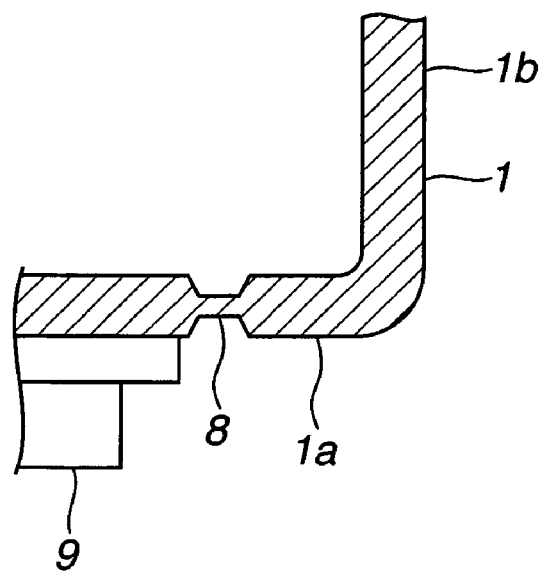
FIG. 5 is a fragmentary cross-sectional view of another modified example of the case of the air bag module of the embodiment, provided with a weakened portion which is formed as a thin wall part.
Figure 6:
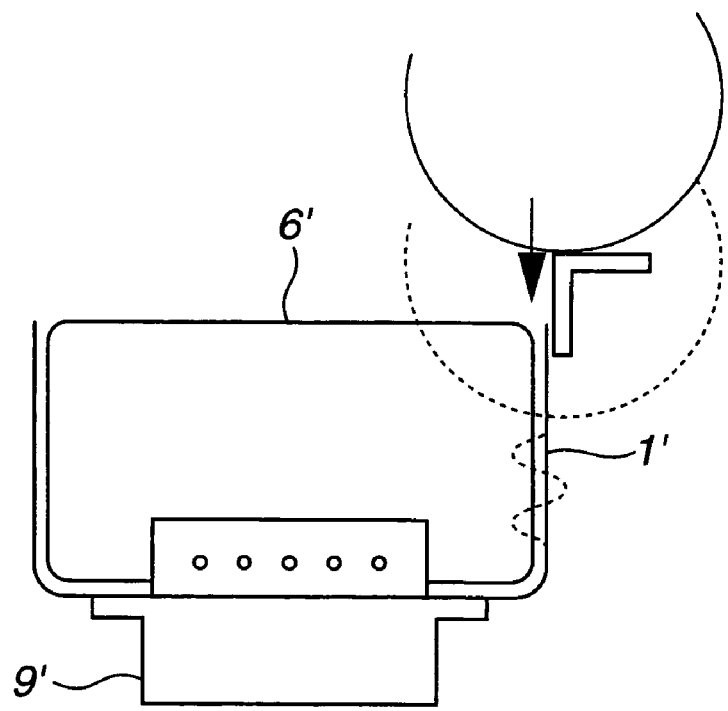
FIG. 6 is a cross-sectional illustration of a conventional air bag module, showing a manner for absorbing an impact acted on an instrumental panel.
Figure 7:
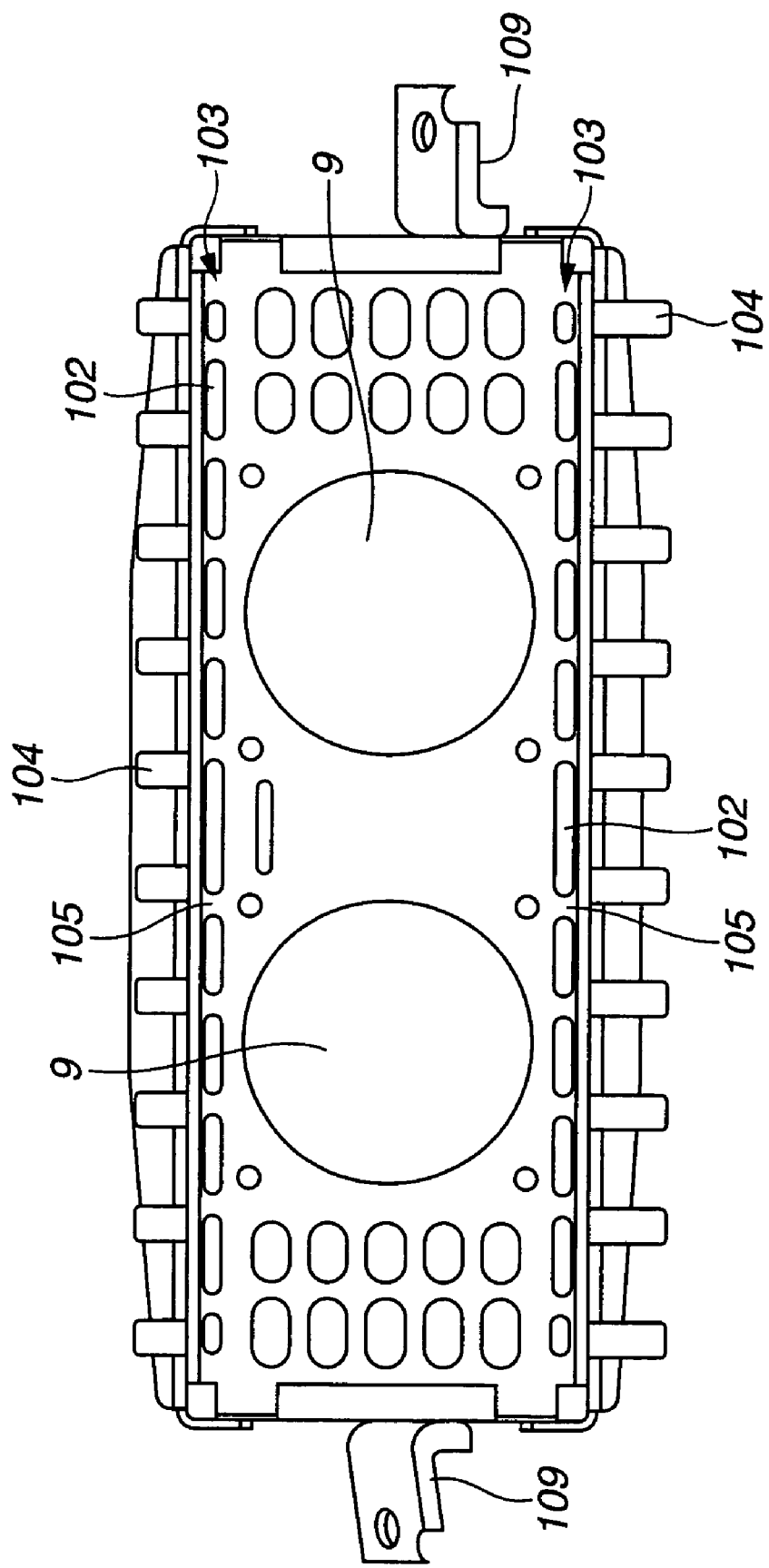
FIG. 7 is a bottom view of another embodiment of the air bag module according to the present invention.
Figure 8:
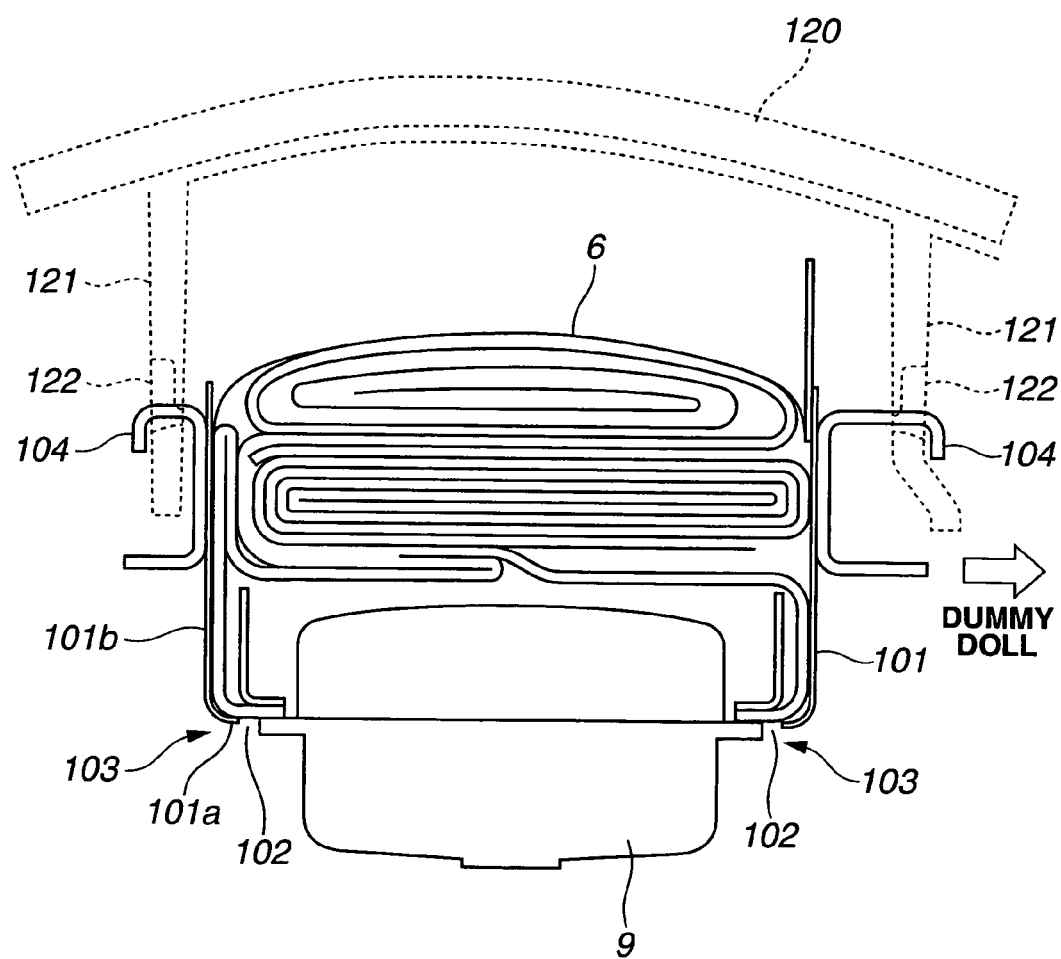
FIG. 8 is a cross-sectional view of the air bag module of FIG. 7, showing the basic configuration of the air bag module.

FIG. 1 is a bottom view of an embodiment of an air bag module according to the present invention. FIG. 2 is a cross-sectional illustration of the air bag module of FIG. 1, showing the basic configuration of the air bag module. FIG. 3 is a cross-sectional illustration of the air bag module of FIG. 1, showing a manner for absorbing an impact acted on an instrumental panel. FIG. 4 is a fragmentary perspective view of a modified example of a case of the air bag module of the embodiment, provided with a weakened portion which is formed into the U-shape in cross-section. FIG. 5 is a fragmentary cross-sectional view of another modified example of the case of the air bag module of the embodiment, provided with a weakened portion which is formed as a thin wall part. FIG. 6 is a cross-sectional illustration of a conventional air bag module, showing a manner for absorbing an impact acted on an instrumental panel. FIG. 7 is a bottom view of another embodiment of the air bag module according to the present invention. FIG. 8 is a cross-sectional view of the air bag module of FIG. 7, showing the basic configuration of the air bag module.

The air bag module of this embodiment includes a case 1 which is formed with an opening at its front or upper side. The air bag module of this embodiment is mounted on an automotive vehicle. The case 1 accommodates therein an air bag 6 whose part is connected to the case 1. The air bag 6 is to be supplied with gas generated by gas generators (or inflators) 9 so as to deploy. The opening of the case 1 is covered with a lid member or part of an instrumental panel 4. As shown in FIG. 1, the case 1 includes a generally rectangular bottom wall section 1a which is formed with a plurality of short slits (or elongate through-holes) 2 which are separate from each other and aligned with each other. The short slits 2 are located at one (rear) side portion of opposite two side portions which laterally extends or generally parallel with a front windshield (not shown) of the vehicle. The one (rear) side portion formed with the slits 2 is to be located at the side of a dummy doll D (shown in FIG. 2), i.e., nearer to the dummy doll D than the other (front) side portion. The front side portion is located forward of the rear side portion in or with respect to the vehicle. It will be understood that the one side portion formed with the slits 2 serves as a weakened portion 3 which is weakened against impact. The bottom wall section 1a is disposed generally horizontal in the vehicle, and integrally connected with a side wall section 1b which extends generally perpendicular to the bottom wall section 1a. As seen in FIG. 2, the gas generators 9 are fixedly installed to the bottom wall section 1a. The part of the air bag 6 is fixedly connected to the bottom wall section 1a in such a manner that a part of each gas generator 9 is positioned inside the air bag 6.

As will be understood from FIGS. 1 and 2, according to this embodiment, when the head or arm of the dummy doll D strikes against the instrumental panel 4, an impact acted on the instrumental panel 4 is absorbed under deformation of the weakened portion 3 as shown in FIG. 3, so that the impact reacted on the head or the arm is decreased. By virtue of the deformation of the weakened portion 3 as a deformed portion 3' as shown in FIG. 3, the side wall section 1b of the case 1 moves downward from the level of the bottom wall section 1a by a distance L.

It will be understood that, the shape of each slit 2 formed at the above weakened portion 3 may be circular, elliptical, or of an elongation hole. Otherwise, the slits 2 may be arranged in a zigzag pattern.

By the way, also in the conventional technique as discussed in Japanese Patent Provisional Publication No. 2001-63503, absorption of impact is carried out by the air bag module in such a manner that a side wall section of the case 1' deforms as indicated by a broken line in FIG. 6 similarly to the present invention. However, in case that the air bag 6' formed large-sized or made of stiff base cloth is accommodated in the case of the small size, the side wall section of the case 1' is difficult to deform. Under this condition, when the side wall section further deforms, the deformed side wall section is pressed on the air bag 6'. Consequently, the case 1 cannot sufficiently absorb the impact acted on the instrumental panel 4.

In contrast, according to the embodiment, the air bag module can be provided with a function for securely absorbing an impact acted on the instrumental panel 4 although the air bag 6 is accommodated in a small space. This function cannot be provided in the above conventional technique.

It will be understood that the weakened portion 3 may be provided by forming a bent portion 7 in the above-mentioned side portion as shown in FIG. 4. The bent portion 7 extends along the length of the above-mentioned side portion and is generally U-shaped in section so as to form a groove. Otherwise, the weakened portion 3 may be provided by reducing the wall of the above-mentioned side portion so as to form an extending thin wall part 8 as shown in FIG. 5.

FIGS. 7 and 8 illustrate another embodiment of the air bag module according to the present invention, similar to the air bag module of FIGS. 1 to 3, so that the same reference numerals as in the embodiment discussed above are assigned to the substantively same parts and elements thereby omitting a duplicated explanation. A case 101 of an air bag module has a bottom wall section 101a which is formed with two rows of aligned (a plurality of) short slits (or elongate through-holes) 2 which are separate from each other and aligned with each other. One row of the aligned short slits 2 is located at one side portion of opposite two side portions which laterally extends or generally parallel with a front windshield (not shown) of the vehicle. The one side portion formed with the slits 2 is to be located at the side of the dummy doll D (shown in FIG. 2), i.e., nearer to the dummy doll D than the other side portion. The other side portion formed with the slits 2 is to be located at the side of the front windshield, i.e., farther from the dummy doll D than the above one side portion. Each row of the aligned slits 102 serves as a weakened portion which is weak against impact. In FIG. 8, an air bag cover (lid member) 120 or part of the instrumental panel is indicated by a phantom line (or a broken line). The air bag cover 120 includes installation peaces 121, 121 formed with respective through-holes 122. Hooks 104 fixed to the case 101 are respectively caught in the through-holes 122 so that the air bag cover 120 is installed to the case 101. The case 101 is fixed through a bracket 109 to a reinforcement member (not shown) disposed at the interior of the instrumental panel.

In the event of striking of the dummy doll D to the instrumental panel 4 as shown in FIG. 2, in any of or both of the two rows of the aligned slits 102, the slits 102 and 103 are expanded or each bridge portion 105 between the adjacent slits is broken in accordance with the magnitude and the acting position of load so as to absorb the impact. As a result, a side wall section 101b of the case 101 moves downward thereby suppressing an impact reacted on the head or the arm of the dummy doll which has been struck against the instrumental panel 4. According to this embodiment, the two rows of the aligned slits 102 are disposed respectively at the opposite side portions of the bottom wall section 101a of the case 101. Consequently, in case of deforming both two aligned slits 102 and 103, it become possible to further downwardly move the chamber for accommodating the air bag 6 in the case 101. As a result, an air bag module according to this embodiment can cope with a wide range of loads, producing impact absorption effects.

It will be appreciated that the principle of this invention is useable for not only the air bag module for a passenger at a front passenger seat but also that for passengers at all seats and that installed to an interior wall of the vehicle.

The air bag module according to the embodiments has the above-discussed configuration and therefore exhibits the following results:

(1) When striking of the dummy doll occurs against the instrumental panel, the case is deformed in such a manner that the weakened portion of the bottom wall section serves as a starting point of deformation, without causing buckling of a vertical wall or side wall section. As a result, with a process for absorbing an impact acted on the instrumental panel, the case can securely absorb the impact without interference with the folded air bag.

(2) When head or the like of the dummy doll strikes against the instrumental panel in such a direction that the head rotationally moves around the waist of the dummy doll as a center. Generation of an excessive reaction force can be effectively prevented because the weak portion is formed along the width direction of the vehicle.

(3) Each bridge portion between the adjacent slits is adjustable, and therefore it becomes possible to adjust the reaction force characteristic of a breaking force. Additionally, the slits are formed simultaneously with the case when the case is produced by pressing. As a result, the manufacturing cost for the air bag module can be prevented from being increased, while the weight-lightning of the case can be achieved.

(4) In case that the weakened portion is formed U-shaped in cross-section, energy acted on the instrumental panel can be absorbed under plastic deformation of the weakened portion. As a result, a reaction force characteristic curve becomes smooth.

The entire contents of Japanese Patent Application No. 2004-312171, filed Oct. 27, 2004 is incorporated herein by reference.

As discussed above, discussion has been made on the preferable embodiments for carrying out the present invention. The invention is not limited to the embodiments described above. Modifications and variations of the embodiment described above will occur to those skilled in the art, in light of the above teachings.

What is claimed is:

1. An air bag module comprising:
a case having an opening;
an air bag accommodated within and connected with said case, said air bag being projectable out of said case through the opening of said case;
a gas generator for generating gas to be supplied into said air bag to inflate said air bag; and
a lid member for covering the opening of said case,
wherein said case includes a bottom wall section integrally formed with a weakened portion which is formed extending along a width direction of a vehicle, wherein the weakened portion has intermittently formed slits aligned in the bottom wall section of said case, wherein the bottom wall section of said case has front and rear ends which extend linearly along the width direction the vehicle, the front end being located forward of the rear end in the vehicle, wherein said case has front and rear side portions which are located adjacent and extend along the front and rear ends, respectively, wherein the intermittently formed slits are formed at the rear side portion.

2. An air bag module comprising:
a case having an opening;
an air bag accommodated within and connected with said case, said air bag being projectable out of said case through the opening of said case;
a gas generator for generating gas to be supplied into said air bag to inflate said air bag; and
a lid member for covering the opening of said case,
wherein said case includes a bottom wall section integrally formed with a weakened portion which is formed extending along a width direction of a vehicle, wherein the weakened portion includes first and second weakened portions each of which has intermittently formed slits aligned in the bottom wall section of said case, wherein the bottom wall section of said case has front and rear ends which extend linearly along the width direction the vehicle, the front end being located forward of the rear end in the vehicle, wherein said case has front and rear side portions which are located adjacent and extend along the front and rear ends, respectively, wherein the first and second intermittently formed slits are formed respectively at the front and rear side portions.

3. An air bag module comprising:
a case having an opening, said case including a side wall section and a bottom wall section connected to the side wall section, the side wall section defining the opening;
an air bag accommodated within said case and connected with the bottom wall section of said case, said air bag being projectable out of said case through the opening of said case;
a gas generator for generating gas to be supplied into said air bag to inflate said air bag, said gas generator being connected with the bottom wall section of said case; and
a lid member for covering the opening of said case, said lid member being connected to the side wall section of said case,
wherein the bottom wall section of said case is one piece and formed with a weakened portion which is deformable to absorb an impact applied onto said lid and transmitted through the side wall section.

4. An air bag module comprising:
a case having an opening, said case including a side wall section and a bottom wall section connected to the side wall section;
an air bag accommodated within said case, said air bag being projectable out of said case through the opening of said case;
a gas generator for generating gas to be supplied into said air bag to inflate said air bag, said gas generator being connected with the bottom wall section of said case; and
a lid member for covering the opening of said case,
wherein the bottom wall section of said case is one piece of material with the weakened portion formed therein which is deformable to absorb an impact applied onto said lid member and transmitted through the side wall section.

5. An air bag module as claimed in claim 4, wherein the weakened portion is deformable upon an impact being applied to said case, the weakened portion serving as a starting point of deformation of said case.

6. An air bag module as claimed in claim 4, wherein said case includes a side wall section integral with and extending generally perpendicular to the bottom wall section, wherein the weakened portion is deformable upon an impact being applied to the side wall section, the weakened portion serving as a starting point of deformation of said case.

7. An air bag module as claimed in claim 4, wherein the opening of said case is formed at a front side of said case, the opening being located opposite to the bottom wall section of said case.

8. An air bag module as claimed in claim 4, wherein the weakened portion is formed extending along a width direction of a vehicle.

9. An air bag module as claimed in claim 4, wherein the weakened portion includes a bent portion extending along length of the weakened portion.

10. An air bag module as claimed in claim 4, wherein the weakened portion is weaker in resistance to impact than the other portions of the bottom wall section.

11. An air bag module comprising:

a case having an opening, said case including a side wall section and a bottom wall section connected to the side wall section;

an air bag accommodated within said case, said air bag being projectable out of said case through the opening of said case;

a gas generator for generating gas to be supplied into said air bag to inflate said air bag, said gas generator being connected with the bottom wall section of said case; and a lid member for covering the opening of said case, wherein the bottom wall section of said case is integrally formed with a weakened portion such that the bottom wall is a single piece of material with the weakened portion integrally formed therein which is deformable to absorb an impact applied onto said lid member and transmitted through the side wall section, wherein the weakened portion has intermittently formed slits aligned in the bottom wall section of said case.

* * * * *